A. W. Lozier.
Horse-Hay-Fork.
Nº 84559        Patented Dec. 1, 1868.
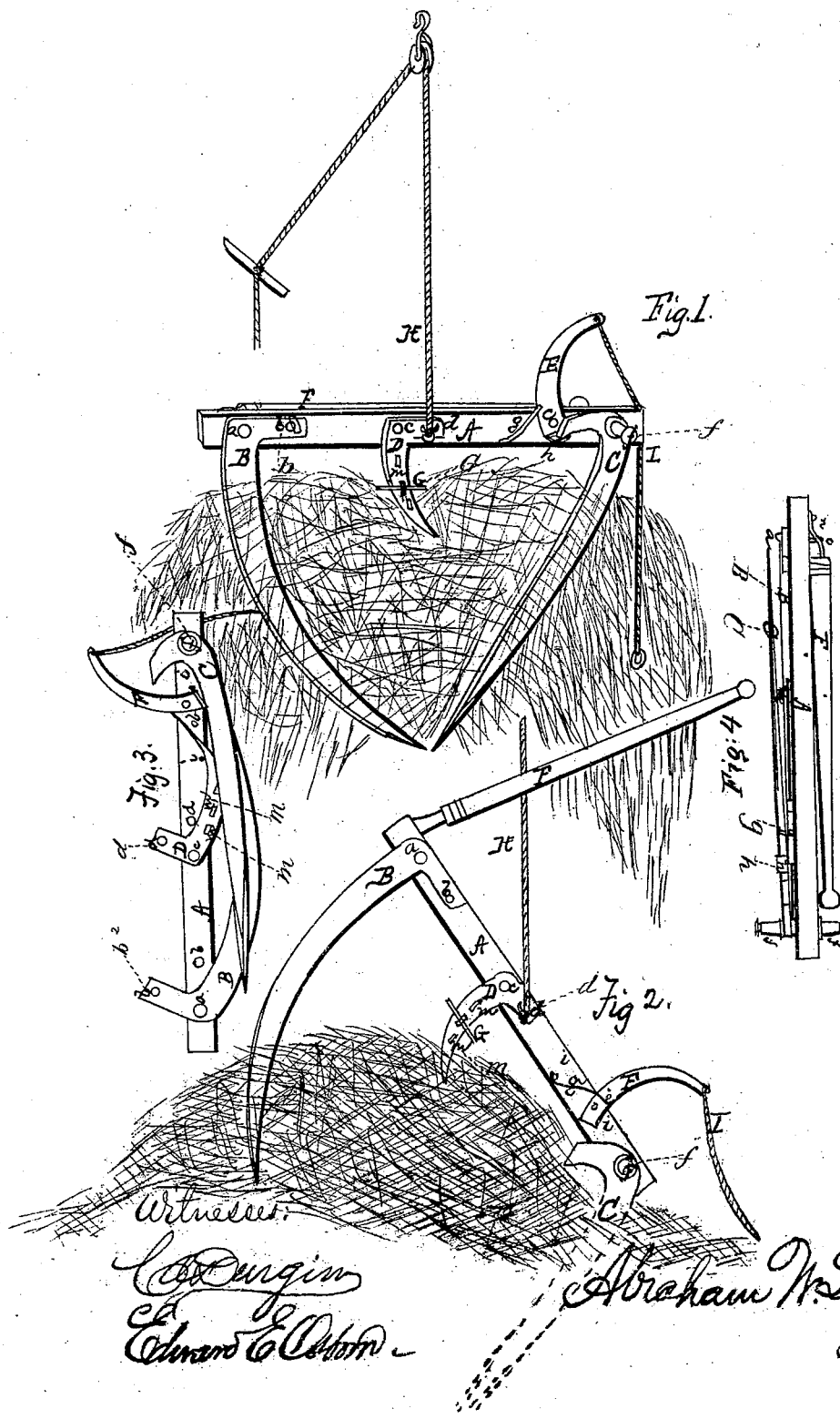

United States Patent Office.

ABRAHAM W. LOZIER, OF NEW YORK, N. Y.

Letters Patent No. 84,559, dated December 1, 1868.

IMPROVEMENT IN HORSE HAY-FORKS.

The Schedule referred to in these Letters Patent and making part of the same.

*To all whom it may concern:*

Be it known that I, ABRAHAM W. LOZIER, of the city, county, and State of New York, have invented a new and useful Improvement in Hay-Elevating Forks; and I do hereby declare the following to be a full, clear, and exact description thereof, reference being had to the accompanying drawings, and the figures and letters of reference thereon.

Figure 1 of the drawings is a perspective view of the fork, with its several parts shown in position, when being raised with a load.

Figure 2 is a side view of the fork, showing the manner in which it is operated to seize its load.

Figure 3 is a view of the same closed, when not required for use.

Figure 4 is a top view of the same.

Similar letters of reference indicate like parts in the several drawings.

In the construction of hay-elevating forks, so far as my knowledge extends, several defects exist, which are objectionable in their general use. These defects consist, especially when the forks are constructed after the manner of grappling-tongs, in their being so constructed that a considerable space above the load is taken up by the arms, &c., to which the hoisting-rope is attached, so that the load cannot be guided close to the beams to be discharged, in their being difficult and awkward to handle in the operations of loading and discharging the load, and in their being bulky and unwieldy in transportation.

The object of my invention is to so construct and arrange a hay-elevating fork that it may be easily operated in loading and unloading; that shall grasp and retain its load firmly; that can be readily adjusted to take different-sized loads, so that it may be worked with one or two-horse power; that can be elevated close to the beams of the barn, and may also be folded into a small compass for transportation or storage.

To enable others skilled in the art to make and use my invention, I will describe its construction, and the manner of operating it.

To the bar A are secured, by pivots *a c f*, the two curved tines B D, and the straight tine C. The two former, when in use, are held rigidly in place on the bar by the screws *b d*. The third tine is retained in place, while the fork is being elevated, by the spring-catch E.

This catch, formed of the curved lever E, is pivoted to the bar A by the screw *e*, and its lower end is turned up, to form a ledge, *h*, on which the end of the tine C rests. It is held against a small stop, *l*, on the bar by the spring *g*, so that its ledge *k* is held in proper position beneath the end of the tine, and is operated by the cord I, secured to its upper end.

The first tine, B, is constructed of a curved form, its inner edge forming an arc of a circle, having its centre at the pivot *f*, and its outer edge is bevelled a short distance upwards from its point to form a cutting-edge.

The second tine is made of a smaller size than the former, but of a similar curve, and is likewise bevelled for the same purpose. It is also made with several slots, *m m m*, for receiving a smaller shoulder on the plate G, to secure this plate to this tine at any desired distance from its point.

This plate acts as a gauge, to regulate the quantity of hay to be taken up by the fork at any one time, and this it does by preventing the tine D from entering the hay farther than the point at which it is adjusted.

The third tine, C, is formed of a straight blade, turning on the pivot *f*, and curved at its upper end, as plainly shown in the drawings. Its point is bevelled on both sides, so as to allow it to enter the hay with facility.

The lever or handle F, which is used in the operation of loading the fork, is attached by the pivot *n* to the back of the bar A, and is held in place along the side of the bar by the stop *o*, which acts also as a fulcrum for the end of the lever.

The hoisting-rope H is secured to the bar at *d*, and, when properly attached, the several parts of the fork, when it is elevated, are in equilibrium, so that the top of the bar will rise in a horizontal position.

This construction permits the fork to be raised close up to the pulley-block, when necessary.

The fork will be used and operated as follows:

The two tines, B D, are first secured in place on the bar by the screws *b d*, and the plate G is adjusted on the tine D, to regulate the quantity of hay to be seized by the fork. This quantity is governed by the power to be used in working the fork. If but one horse is used, the plate is adjusted nearer the point of the tine, while, if more power is to be used, the gauge is set further from the point. The hoist-rope H is then secured to the fork, and the power is applied to the same through the medium of a pulley-block or other means that may answer.

The tine C, being released from the catch E, and opened outwards, its point is thrust into the load or cock of hay, and forced down into it by the operator placing his foot on the pivot *f*, which is made longer than the others for this purpose, and throwing his weight thereon. The handle F is then grasped by the operator, and raised up until it is arrested by the pin *o*, and the other tines are forced into the hay by a forward movement of the handle.

The construction of these tines suffers them to enter the hay with but little obstruction, their inner edges being arcs of circles, which have their centres at the pivot *f*, about which, as a centre, the bar A turns.

The downward pressure of the tines into the hay is continued, until the catch E is thrown under the curved end of the tine C, and the fork is then ready to be drawn up with its load.

On being elevated to the place where the hay is to be deposited, the load is discharged by the operator pulling the catch E from under the end of the tine C, by means of the cord I. The weight of the load pressing on the end of the tine then throws it back, and the hay drops from the fork.

The fork is then lowered, and the operation of loading repeated.

Having thus fully described my invention,

What I claim, and desire to secure by Letters Patent, is—

1. The combination and arrangement, with the bar A and rigid tine B, of the movable tine C and tripping-lever E, the whole constructed and operating substantially as described, and for the purpose set forth.

2. The horizontal bar A, rigid tine B, movable tine C, and tripping-lever E, in combination with the lever-handle F, the whole constructed and operating substantially as described.

3. The combination of the bar A and tines B and C with the supplementary tine D, for holding the load of hay with greater security, substantially as described, and for the purpose specified.

4. So constructing the supplementary tine D that it may be used as a gauge for taking up the desired quantity of hay, substantially as described and specified.

5. The projecting pivot $f$, in combination with the tine C and bar A, substantially as described, and for the purpose set forth.

ABRAHAM W. LOZIER.

Witnesses:
C. A. DURGIN,
EDWARD E. OSBORN.